June 16, 1925.

G. H. PRICE 1,542,580

DEVICE FOR REPLACING BELTS

Filed April 7, 1924

George H. Price
INVENTOR.

BY John M. Spellman
ATTORNEYS.

Patented June 16, 1925.

1,542,580

UNITED STATES PATENT OFFICE.

GEORGE H. PRICE, OF CORSICANA, TEXAS.

DEVICE FOR REPLACING BELTS.

Application filed April 7, 1924. Serial No. 704,606.

*To all whom it may concern:*

Be it known that I, GEORGE H. PRICE, a citizen of the United States, residing at Corsicana, in the county of Navarro and State of Texas, have invented certain new and useful Improvements in Devices for Replacing Belts, of which the following is a specification.

This invention relates to devices for placing belts upon wheels and pulleys and has for its object to provide such a device which is simple, practical, durable and economical of manufacture, and enabling a large and heavy belt to be easily and quickly placed over a wheel.

The new and approved belt applying device will be clearly understood by reference to the following description, taken in connection with the accompanying drawings forming part hereof and in which.

Figure 1:
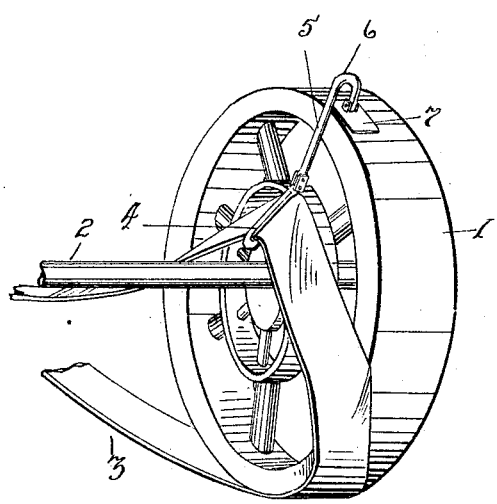
Figure 1 is a perspective view of a wheel illustrating the belt applying device in position to place the belt on a wheel.
Figure 2:
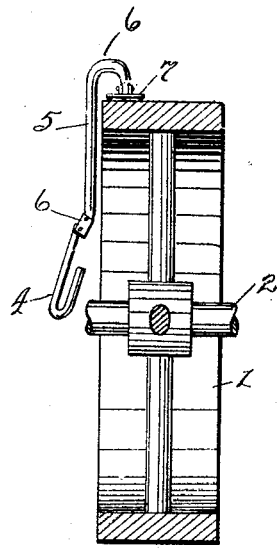
Figure 2 is a vertical sectional view of the wheel with the device shown in Figure 1.
Figure 3:
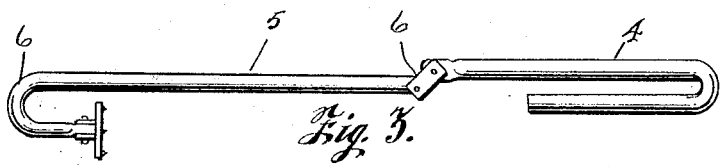
Figures 3 and 4 are, respectively, a side elevational view of the belt applying device and an enlarged detailed sectional view thereof.
Figure 4:
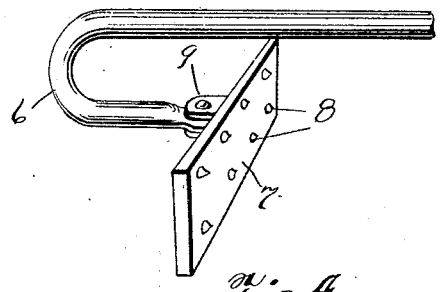

Referring more closely and in detail to the drawings, 1 denotes a belt wheel mounted upon a shaft 2.

The belt applying device comprises a piece of metal, preferably a rod, one portion of which is bent upon itself to form a looped end 4 to receive the belt 3. The looped end 4 is pivoted to the longer piece 5 of the device by small plate links 6—6. The member 5 is also bent upon itself to form a loop 6 and carries at its extremity a plate 7 studded with hobs 8—8. This plate is likewise pivoted at 9 to the member 6 for the purpose of procuring proper adjustment of the plate upon the periphery of the wheel 1. The hobs 8—8 prevent slipping of the plate and enable it to hold firmly.

The belt is first slipped into the looped end 4 of the device, in the manner shown in Figure 1, and the plate 7 placed upon the belt wheel or pulley 1. The belt is thus held firmly in position to enable it when the wheel is turned to ride upon the periphery of the wheel. As the wheel is rotated and the belt engages the wheel, the belt applying device slips off and becomes disengaged from the wheel and belt.

It should be understood that minor changes and modifications may be made in the construction of the invention, in keeping and within the scope of the following claims:

1. A belt applying device including a wheel engaging plate having a hobbed surface; a bar pivoted to said plate and bent at right angles thereto; a second bar pivoted to the free end of the first bar and having its opposite end bent in parallel relationship to the body thereof to engage a belt.

2. A belt applying device including a pair of bars having their ends pivoted together; the other end of one of the bars being bent to engage a hobbed plate at right angles thereto; the other end of the other bar being bent in parallel relationship to the body of the bar to form a belt engaging hook; said plate disengaging the wheel when the belt is thereby replaced.

In testimony whereof I have signed my name to this specification.

GEORGE H. PRICE.